United States Patent [19]

Calvani et al.

[11] Patent Number: 5,069,520
[45] Date of Patent: Dec. 3, 1991

[54] HIGH-SPEED MODULATOR OF THE POLARIZATION OF AN OPTICAL CARRIER

[75] Inventors: Riccardo Calvani, Pino Torinese; Renato Caponi; Giuseppe Marone, both of Turin, all of Italy

[73] Assignee: Centro Studi e Laboratori Telecomunicazioni S.p.A., Turin, Italy

[21] Appl. No.: 467,656

[22] Filed: Jan. 19, 1990

[30] Foreign Application Priority Data

Mar. 28, 1989 [IT] Italy ................ 67214 A/89

[51] Int. Cl.[5] .............................................. G02B 6/26
[52] U.S. Cl. .......................................... 385/1; 385/27; 359/156
[58] Field of Search ............... 350/96.11, 96.12, 96.13, 350/96.14, 96.15, 96.16; 455/609, 610, 611, 612, 616

[56] References Cited

U.S. PATENT DOCUMENTS 4,691,984  9/1987  Thaniyavarn ............ 350/96.14
4,793,676 12/1988  Risk ........................ 350/96.13

OTHER PUBLICATIONS

International Workshop OCTIMA; Rome, Italy; Jan. 24-26, 1989, CNR-7, O.le Aldo Moro; pp. 114-118.
Polarisation Phase-Shift Keying: A Coherent Transmission Technique with Differential Heterodyne Detection: Electronics Letters, May 12th, 1988, vol. 24, No. 10; pp. 642-643.

Primary Examiner—Frank Gonzales
Attorney, Agent, or Firm—Herbert Dubno

[57] ABSTRACT

The modulator comprises an integrated optical switch (6) receiving at an input a linearly-polarized optical carrier and transferring same to a first or a second output (P3, P4), according to the logic values of the bits of a modulating binary data signal. The radiations outgoing from the switch are sent to a polarizing beam splitter (13) with their original polarization or with a polarization rotated by 90° depending on the switch output (P3, P4) from which they come. A signal with the original polarization or with the polarization rotated by 90° is present at the splitter output, depending on the logic values of the bits of the modulating signal.

18 Claims, 3 Drawing Sheets

HIGH-SPEED MODULATOR OF THE POLARIZATION OF AN OPTICAL CARRIER

FIELD OF THE INVENTION

Our present invention relates to optical telecommunications systems and, more particularly, to a high-speed polarization modulator for use in a digital transmission system, where the electrical data signal modulates the state of polarization of an optical carrier.

Polarization modulation of an optical carrier is obtained by sending the carrier to devices whose state of birefringence is modified by the electrical information signal. Modulators for this purpose are usually based on Pockels cells, lithium niobate phase shifters or TE-TM mode converters.

Pockels cells have maximum bandwidth of the order of 50-100 MHz and therefore they cannot be used for high transmission rates (of the order of the Gbits/s). Phase shifters permit bandwidths of the order of some GHz to be attained and hence they are well-suited to high transmission rates. However, to build a modulator, an interferometer is required having a reference branch and a branch containing the phase shifter and the beams from the two branches, polarized according to orthogonal polarization axes, must be combined. That structure not only is complex per se, but it can be used only in that specific application. Mode converters, which are based on integrated interdigited electrode structures (i.e. a group of alternate electrodes with opposite polarity) allow wide bandwidths, and hence high transmission rates, to be attained, but they are not yet commercially available.

OBJECT OF THE INVENTION

The object of the invention is to provide a simple and compact modulator, which operates at high speed and uses commercially available integrated components having a wide range of applications in optical switching (optical switches, power dividers or directional couplers, phase shifters, and the like).

SUMMARY OF THE INVENTION

According to the invention, in a first aspect, a polarization modulator for digital signal transmission systems, where a digital data signal having a number of logic levels modulates the state of polarization of an optical carrier, comprises: an integrated optical waveguide device having at least one input port, at which it receives a linearly-polarized input radiation constituting the optical carrier to be modulated, and two output ports, and comprising means, controlled by said data signal, sharing the optical power associated with the input radiation between a first and a second radiation which are presented at either of the output ports, the power fraction associated with each of said first and second radiation depending on the logic level of the data signal, the radiations outgoing from either output port being sent along a first and a second path, respectively;

means for rotating by 90° the polarization plane of the radiations present on one of said paths; and means responsive to the state of polarization of the radiations present on said two paths, which means receives at a first or a second input the radiations coming from the first or the second path and transfers such radiations onto a modulator output to form a modulated signal consisting of an output radiation presenting a state of polarization depending on the power fraction associated with the radiation sent along either path and hence on the level of the data signal.

In a second aspect of the invention, a polarization modulator for digital signal transmission systems, where a digital data signal having a number of logic levels modulates the state of polarization of an optical carrier, comprises: an integrated optical waveguide device having at least one input port, at which it receives a linearly-polarized input radiation constituting the optical carrier to be modulated, and two output ports, and comprising means, controlled by said data signal, sharing the optical power associated with the input radiation between a first at a second radiation which are presented at either output port and making said radiations arrive at said output ports with a relative phase shift depending on the logic level of the data signal, the radiations outgoing from either output port being sent along a first and a second path, respectively;

means for rotating by 90° the polarization plane of the radiations present on one of said paths; and means responsive to the state of polarization of the radiations present on said two paths, which means receives at a first or a second input the radiations coming from the first or the second path and transfers such radiations onto a modulator output to form a modulated signal consisting of an output radiation presenting two orthogonally polarized components with a relative phase shift depending on the relative phase shift of the radiations sent along the first and second path and hence on the level of the data signal.

BRIEF DESCRIPTION OF THE DRAWING

The invention will be better understood with reference to the annexed drawing, in which.

SPECIFIC DESCRIPTION

Figure 1:
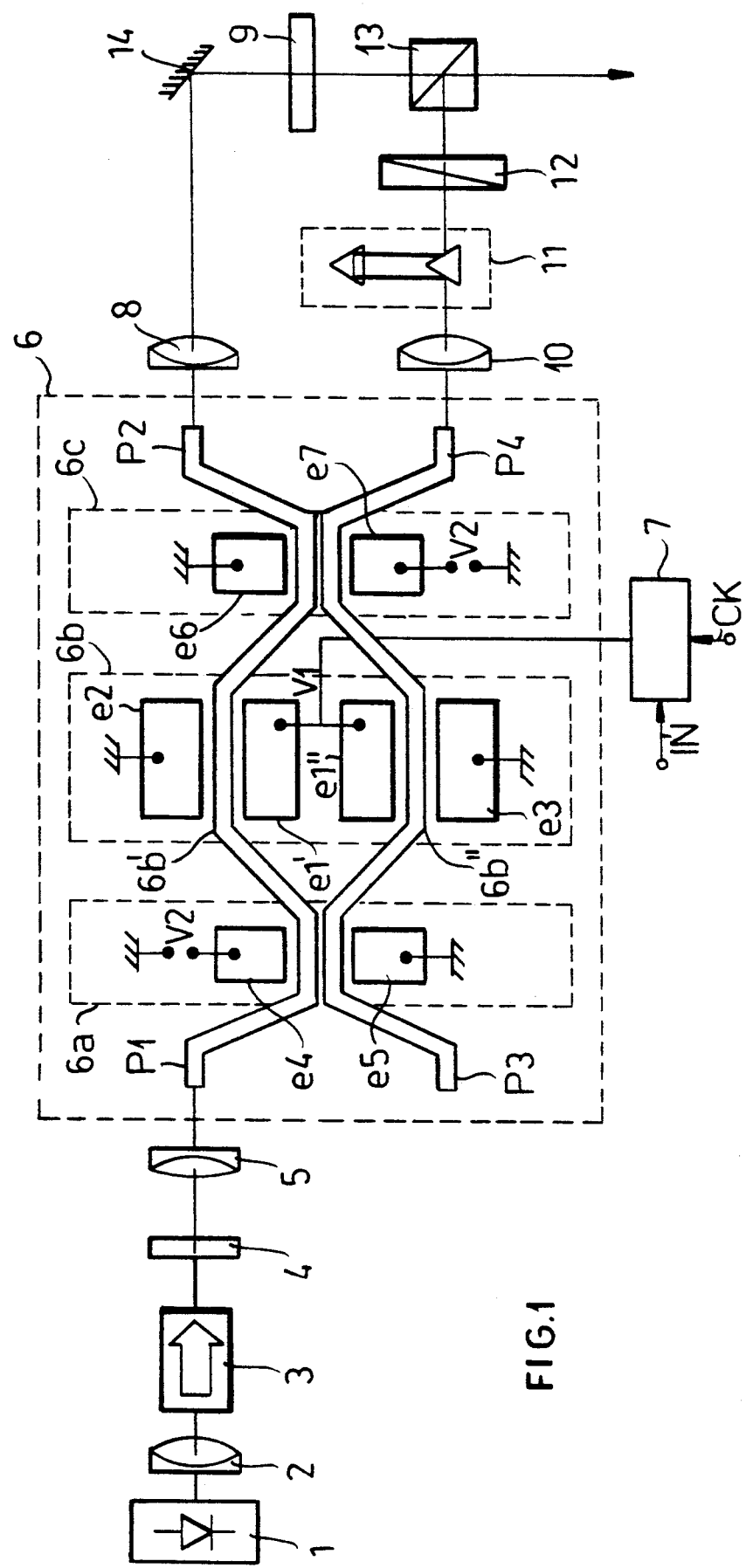
FIG. 1 is a diagram of the modulator for the case of transmission in free space.

In FIG. 1, the light emitted by a source 1, e.g. a semiconductor laser operating at 1550 nm, is collimated by an optical system 2 and passes through an isolator 3 preventing radiations reflected by the various modulator elements from returning to the cavity of laser 1. The radiation outgoing from the isolator, linearly polarized in a plane which can be rotated by a quarter-wave plate 4, is focused by another optical system 5 at an input of a two-by-two optical switch 6, of any commercially available type. More particularly, owing to the characteristics of the commercially available optical switches, the input radiation should have horizontal polarization.

In examplary applications of the present invention, the electrical signal controlling switching in switch 6 may be a binary signal, of which the two logic values correspond respectively to a null voltage and to switching voltage V1 of switch 6. That signal is obtained by coding in an on-off encoder 7 the information to be transmitted. Arrows IN, CK schematize the inputs for the information signals and for synchronism signals timing the operations of encoder 7.

A collimating optical system 8 and a half-wave plate 9 for rotating by 90° the polarization plane of the light emerging from switch 6 are placed on the path of the light outgoing from P2. Along the path of the light outgoing from P4 there are provided, besides collimating optical system 10, an optical delay line 11 to keep the optical lengths of both paths equal and hence to maintain the coherence among the radiations sent along the two paths, and a polarizer 12 for compensating variations of the state of polarization introduced by delay line 11.

The two paths end at the two inputs of a polarizing beam splitter 13, i.e. a device transmitting light polarized in a plane and reflecting orthogonally polarized light. More particularly, beam splitter 13 is oriented so as to transmit the vertical polarization and to reflect the horizontal one. The radiation outgoing from splitter 13 is then sent towards the receiver. A mirror 14 makes the radiation outgoing from port P2 of element 6 arrive at splitter 13.

For a better understanding of the operation of the modulator according to the invention it is convenient to briefly summarize the structure and the operational principle of switch 6. As is known, the switch is an integrated-optics waveguide structure comprising an input coupler 6a, a Mach-Zender interferometer 6b and an output coupler 6c. Input coupler 6a divides the power associated with an input signal between the waveguide portions forming interferometer branches 6b', 6b", which act as phase shifters. The output coupler recombines on either output the signals coming from the two branches of interferometer 6b. Waveguide portions 6b', 6b" are placed between respective pairs of electrodes e1', e2 and e1", e3, respectively. Electrodes e1', e1" are connected to the source of switching voltage V1 (i.e. to encoder 7, in the described application), while electrodes e2, e3 are grounded. Also the waveguide portions forming couplers 6a, 6c are placed between respective pairs of electrodes e4, e5 and e6, e7, respectively: an electrode of each pair is grounded and the other is connected to a source of a voltage V2 (identical for the two couplers), allowing the couplers to be tuned to the wavelength of the light source used. The connection of the electrodes to voltage V2 is opposite in the two couplers. Light entering the switch through one of the inputs, e.g. P1, is equally divided between the interferometer branches. In the absence of voltage V1 (bit 0 of data signal) and assuming that both branches have the same length, at the output coupler there is phase match between the signals coming from the two branches. Voltage V2 causes constructive interference in interferometer branch 6b" connected to P4 and destructive interference in branch 6b' connected to P3, so that a signal is present only at output P4 (cross state). In the presence of voltage V1 (bit 1), and always assuming equal lengths for both branches, light passing in upper branch 6b' undergoes a $+\pi/2$ phase shift and light passing in lower branch 6b" a $-\pi/2$ phase shift: the total phase shift is $\pi$, hence the situation in the output coupler is opposite to the preceding case and light outgoes from P2 (straight-through state).

That stated, the operation of the device according to the invention is as follows. At a given instant, the light polarized in a horizontal plane entering switch 6 through input P1 outgoes from P2 or P4 according to whether the bit of the sequence generated by encoder 7 has logic value 0 or 1. Whatever the active output, the polarization state is always the same as that of the input signal of switch 6. If output P2 is active, the radiation emitted therefrom is converted into a radiation with vertical polarization by half-wave plate 9 and is transmitted through splitter 13. If output P4 is active, the radiation arriving at the splitter has maintained its horizontal polarization and hence is reflected. Thus, the radiation outgoing from splitter 13 has vertical or horizontal polarization according to whether the bit of the information sequence is 1 or 0. The polarization-modulated signal thus obtained is then demodulated in the receiver of the communications system, e.g. with the modalities described by R. Calvani, R. Caponi et F. Cisternino in the paper "Polarization phase-shift keying: a coherent transmission technique with differential heterodyne detection", Electronics Letters, May 12, 1988, Vol. 24, No. 10.

It is clear that the device described satisfies the above-cited requirements. Optical switches are commercially available and, since they are made with integrated-optics techniques, they satisfy simplicity and compactness requirements. Besides, as known, they are characterized in very short switching times, permitting transmission rates of the order of the Gbits/s.

Figure 2:
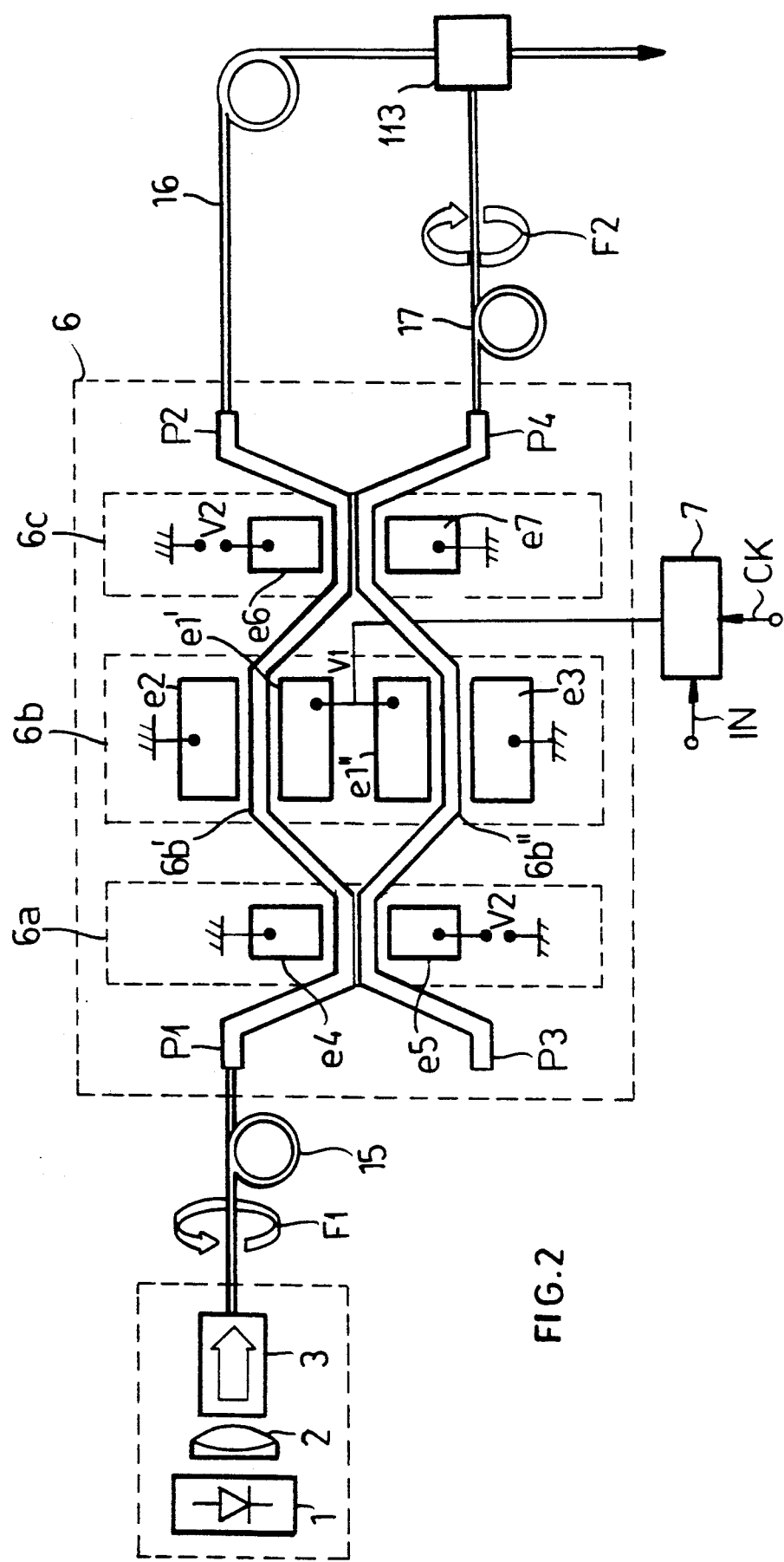
FIG. 2 is a diagram similar to FIG. 1, for the case of transmission in a fiber.

In the case of propagation guided in an optical fiber, the modulator has the structure shown in FIG. 2. Input P1 and outputs P2, P4 of switch 6 are associated with corresponding trunks 15, 16, 17 of polarization-maintaining (or highly birefringent) optical fiber, directly connected to the output of isolator 3 and respectively to the inputs of a polarization maintaining coupler 113, having the same tasks as splitter 13. It is to be appreciated that switches like that described can be equipped during fabrication with fiber portions, to which trunks 15, 16, 17 can be connected. Moreover, modules comprising the source and the isolator and equipped with a fiber portion for connection to an optical fiber are also commercially available. Fiber trunks 16, 17 connected to the switch outputs must have the same length to ensure equal optical paths for the output signals from the switch to coupler 113. Trunk 15 is mounted on a support allowing its end portion to be rotated, as schematized by arrow F1, to ensure that the mode propagating according to the horizontal polarization axis is excited. One at least of the two output fiber trunks, e.g. trunk 16, is also associated with a support of that kind (as schematized by arrow F2), to arrange its end portion so that the polarization plane of the outgoing radiation is the vertical one. If desired, a similar support can be provided for fiber 17 to ensure that the polarization plane of the outgoing radiation is horizontal.

In that embodiment the half-wave plates are no longer necessary, and are replaced by a suitable fiber end orientation. Also delay line 11 can be dispensed with, since the two fiber trunks 16, 17 have the same length. The operation is equivalent to that of the preceding embodiment.

Figure 3:
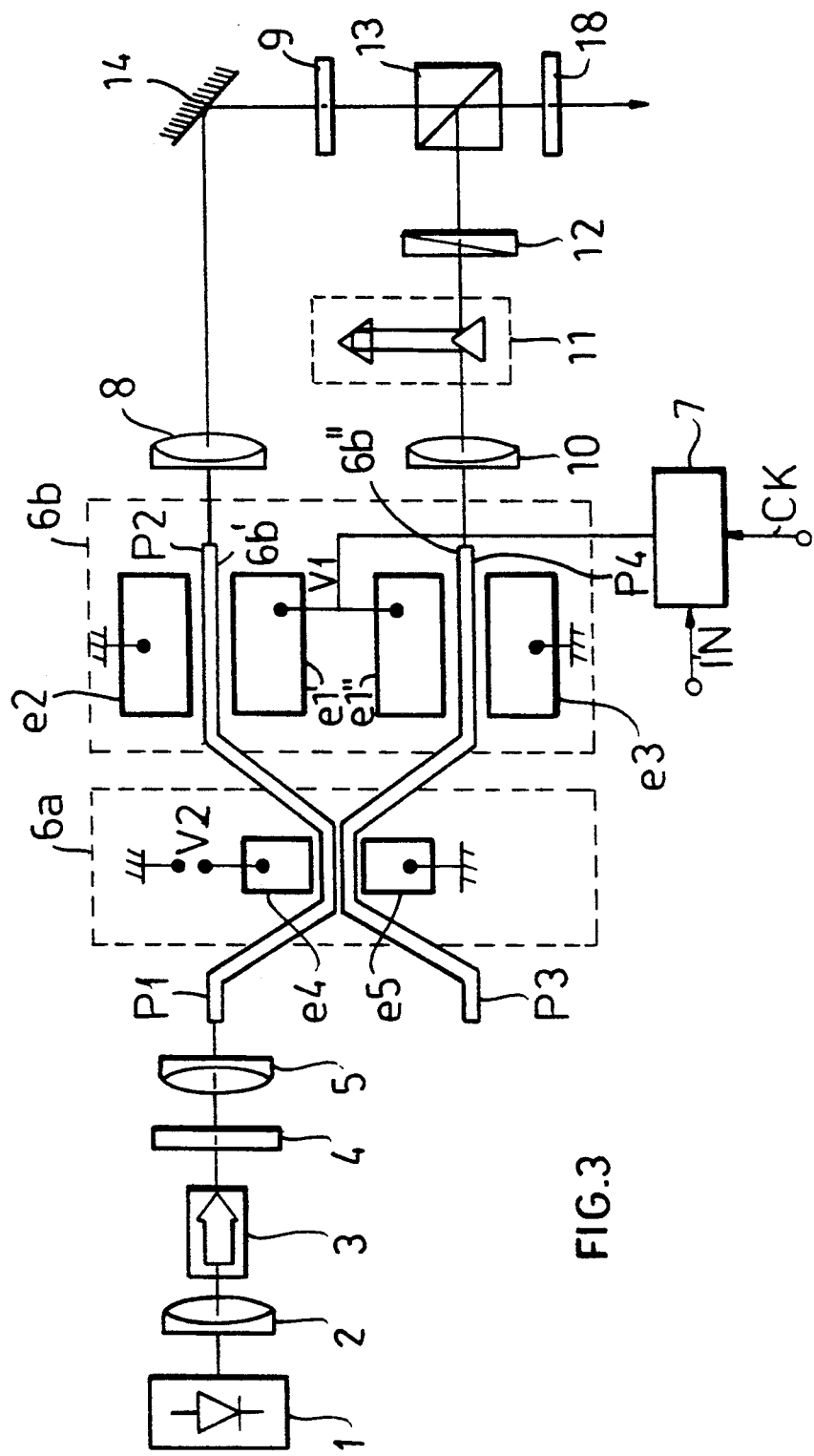
FIG. 3 is a diagram of a variant of FIG. 1.

In the variant shown in FIG. 3, relevant to the case of free-space propagation, switch 6 has been replaced by an integrated optics device comprising only coupler 6a and phase shifters 6b', 6b". The latter are directly connected with outputs P2, P4. The paths of the radiations outgoing from P2, P4 end at splitter 13, as in FIG. 1. Splitter 13 is followed by a quarter-wave plate 18, which is to compensate phase differences among the output fields of the input coupler and to make the phase of the modulator output signals depend solely on the electro-optic action of voltage V1. The other modulator components remain unchanged, and are denoted by the same reference numerals as in FIG. 1. Of course, the modification shown in FIG. 3 can be made also for the embodiment of FIG. 2.

The operation of this variant is as follows: the light entering through P1 is divided in equal parts between the two guides 6b', 6b", as in the previous case. Output coupler 6c (FIGS. 1 and 2) is lacking, thus there is no recombination of the signals present in the two guides, so that both outputs P2, P4 are active at the same time. The signals outgoing from P2 and P4 arrive with orthogonal polarizations at splitter 13, whose output signal will present two orthogonally-polarized components. The relative phase of such components depends on the input signal phase and on the possible phase shift introduced by guide portions 6b', 6b". More particularly, in case of bit 0, the two components do not undergo phase shifts in guide portions 6b', 6b" and will be in phase at the output of quarter-wave plate 18 which, as mentioned, compensates possible phase shifts introduced by the input coupler; in case of bit 1, the two components are phase shifted by $\pm\pi/2$, respectively, by guides 6b', 6b", and plate 18 will cause said components to be actually out of phase by $+\pi/2$ and $-\pi/2$, respectively, with respect to the case of bit 0.

Fields with symmetrically phase-shifted components can be of advantage in case of polarization phase-shift keying transmissions, since the signal-to-noise ratio can be improved by suitable filters, as described by R. Calvani, R. Caponi, F. Cisternino, G. Marone and P. Poggiolini in the paper "Polarization phase-shift keying for coherent optical transmissions with differential heterodyne detection", presented at the International Workshop OCTIMA, Roma, Jan. 24–26, 1989.

The characteristics of simplicity and compactness of the embodiment of FIGS. 1 and 2 are clearly present also in the embodiment of FIG. 3. A device like that formed by coupler 6a and phase shifters 6b', 6b" can be made by the same process leading to the manufacture of an optical switch, simply by interrupting the doping in correspondence with the ends of guides 6b', 6b".

Phase-shifters 6b', 6b" can have different lengths and introduce phase shifts with different absolute values which need not to be 0 or $\pi/2$; however, simply by acting on the voltage supplied to electrodes e1', e1", the phase shifts introduced by a bit 0 and by a bit 1 can be actually 0 and $\pi/2$, or more generally, for the case of FIGS. 1 and 2, the signals at the output coupler can be out-of-phase by $\pi$.

Moreover, even if in the preceding description reference has been made to a binary modulating signal, the invention can also be used in connection with multilevel signals. In that case, the optical path in guide portions 6b', 6b" will have lengths depending on the voltage values associated with the different levels of the information signal. Consequently, also the phase shifts caused by such guide portions will depend on the levels of the information signal. For instance, considering again a symmetrical structure and assuming that the information signal has n equally spaced levels and that voltages 0 and V1 are associated with the lowest and the highest level, respectively, such lowest and highest levels will cause phase shifts 0 and $\pm\pi/2$, respectively, in the signals travelling along guides 6b', 6b", whereas the intermediate levels will cause phase shifts differing each by $\theta=\pi/n$, in absolute value, from the phase shift caused by an adjacent level.

In the embodiments of FIGS. 1 and 2, taking into account that the electric fields at the switch outputs are proportional to $\sin\theta$ and $\cos\theta$, respectively (as it can be demonstrated by simple theoretical considerations), constructive or destructive interference will occur at the output coupler in correspondence with the lowest ot the highest signal level (as in the case of a binary information signal), and hence only one switch output will be active; at the intermediate levels, the output coupler will share the optical power present at the end of guide portions 6b', 6b" among the two outputs and a signal will be present on both paths leading to splitter 13 or coupler 113: the output signals of such splitter or coupler will exhibit states of polarization regularly distributed between the horizontal and vertical linear polarizations. In the embodiment of FIG. 3, the output signals of the splitter or coupler will comprise two orthogonal components with different relative phase shifts, varying in steps of $2\pi/n$ when passing from one level to the adjacent one of the modulating signal. In other words, states of polarization are obtained which are represented by regularly spaced points on a maximum circle in the so called Poincaré sphere.

The amplitude modulation performed by the switch shown in FIGS. 1 and 2 could also be obtained by input coupler 6a alone, provided it receives as control signal a signal representative of the modulating signal (more particularly, a voltage having two different values, e.g. 0 and V, in correspondence with the two logic values of a binary information signal, or a voltage varying in steps from a minimum to a maximum value, in case of a multilevel information signal). Thus, in the case of multilevel signals, if both input coupler 6a and phase shifter 6b are controlled by respective signals obtained from the information signal through a suitable encoder, both the relative phase of the signals arriving at the two output ports and the amplitude ratio of same can be made dependent on the modulating signal level. That further degree of freedom allows any state of polarization to be obtained at the modulator output, i.e. polarization signals are obtained which are represented by points arranged in any manner on the Poincaré sphere. The two control signals can be obtained from respective groups of the bits of a binary representation of the different levels of the modulating signal: for instance, in case of a 4-level signal (whose levels can be represented by 2 bits), the less significant bit can be used to control the amplitude and the more significant bit the phase; for a signal with more than 4 levels, the least significant bit of the level representation can be still used to control the amplitude and the other bits to control the phase, and so on.

We claim:

1. A polarization modulator for a digital signal transmission system in which a digital data signal (IN) having a plurality of logic levels modulates a state of polarization of an optical carrier, said modulator comprising:

an integrated optical waveguide device having at least one input port receiving a linearly-polarized input radiation constituting an optical carrier to be modulated, two output ports, and means controlled by said data signal for sharing optical power of the input radiation between a first radiation and a second radiation outgoing at said output ports respectively, power fraction associated with each of said first and second radiations depending on a logic level of the data signal, the radiations outgoing from said output ports being sent along a first path and a second path, respectively;

means for rotating by 90° the polarization plane of the radiation present on one of said paths; and means responsive to a state of polarization of the radiations present on said paths for receiving at a first and a second input respectively for the radiations coming from the first and the second paths and for transferring radiations from said paths to a modulator output to form a modulated signal consisting of an output radiation presenting a state of polarization depending on a power fraction associated with the radiation sent along the respective path and hence on the level of the data signal.

2. A modulator as defined in claim 1, wherein said integrated optical waveguide device is an optical switch.

3. A modulator as defined in claim 1, wherein said integrated optical waveguide device is a directional coupler.

4. A modulator as defined in claim 1 wherein said means controlled by said data signal transfers the whole of the optical power associated with the input radiation at either output port in correspondence respectively with a lowermost and an uppermost level of the data signal.

5. A modulator as defined in claim 4, wherein said means controlled by the data signal are arranged to share the optical power associated with the input radiation between the first and second radiations in relative proportions depending on the logic level of the data signal, under the control of a first control signal obtained from the data signal, and to make said radiations arrive at said output ports with a relative phase shift depending on the logic level of the data signal, under the control of a second control signal obtained from the data signal.

6. A modulator as defined in claim 15, wherein is a binary signal.

7. A modulator as defined in claim 6 wherein said means controlled by the data signal are arranged to make the first and second radiation arrive at the respective output ports with a first or a second phase shift differing by $\pi$, depending on whether the binary data signal has a first or a second logic value.

8. A modulator as defined in claim 7 wherein controlled by the data signal are arranged to make the first and second radiation arrive at the respective output ports in phase, if the data signal has said first logic value, or undergo phase shifts of $+\pi/2$ and $-\pi/2$, respectively, when the modulating signal has said second logic value.

9. A modulator as defined in claim 15, which along one of said paths, means equalizing the optical length of said paths.

10. A modulator as defined in claim 9, wherein means for compensating variations of the state of polarization introduced by said equalizing means is located between said equalizing means and said means responsive to the state of polarization.

11. A modulator as defined in claim 1 which comprises a first trunk of a highly birefringent optical fiber, connected to said input port to transfer thereto the carrier to be modulated, and a second and a third trunk of a highly birefringent optical fiber, which have equal lengths, are connected to said first and second output port, respectively, and form at least a part of said first and second path, and wherein the means for rotating the polarization plane of the signals sent along one of said paths consists of means for rotating an end portion of one of said fiber trunks by 90° around its axis.

12. A modulator as defined in claim 1 wherein said data signal is a binary signal.

13. A modulator as defined in claim 1 which comprises, along one of said paths, means equalizing the optical length of said paths.

14. A modulator as defined in claim 13 wherein means for compensating variations of the state of polarization introduced by said equalizing means is located between said equalizing means and said means responsive to the state of polarization.

15. A polarization modulator for a digital signal transmission system, wherein a digital data signal having a plurality of logic levels, modulates a state of polarization of an optical carrier, said modulator comprising:

an integrated optical waveguide device having at least one input port, at which receiving a linearly-polarized input radiation constituting an optical carrier to be modulated, two output ports, and means controlled by said data signal, for sharing the optical power associated with the input radiation between a first at a second radiation outgoing at said output ports respectively and making said radiations arrive at said output ports with a relative phase shift depending on the logic level of the data signal, the radiations outgoing from either output port being sent along a first path and a second path, respectively;

means for rotating by 90° the polarization plane of the radiation present on one of said paths;

means responsive to a state of polarization of the radiations present on said two paths for receiving at a first input and a second input respectively, the radiations coming from the first and the second path and transferring said radiations to a modulator output to form a modulated signal consisting of an output radiation presenting two orthogonally polarized components with a relative phase shift depending on the relative phase shift of the radiations sent along the first and second path and hence on the level of the data signal.

16. A modulator as defined in claim 15, wherein said integrated optical device comprises a directional coupler and a phase shifter.

17. A modulator as defined in claim 6 wherein said means responsive to the state of polarization is followed by means for compensating possible phase shifts introduced by the directional coupler.

18. A modulator as defined in claim 15 which comprises a first trunk of a highly birefringent optical fiber, connected to said input port to transfer thereto the carrier to be modulated, and a second and a third trunk of a highly birefringent optical fiber, which have equal lengths, are connected to said first and second output ports, respectively, and form at least a part of said first and second path, and wherein the means for rotating the polarization plane of the signals sent along one of said paths consists of means for rotating an end portion of one of said fiber trunks by 90° around its axis.

* * * * *